United States Patent
Flischel

[11] Patent Number: 5,878,537
[45] Date of Patent: Mar. 9, 1999

[54] SQUIRREL-PROOF POST

[76] Inventor: Thomas J. Flischel, 3582 Heekin Ave., Cinti, Ohio 45208

[21] Appl. No.: 907,362

[22] Filed: Aug. 7, 1997

[51] Int. Cl.[6] .................................................. A01K 39/01
[52] U.S. Cl. ...................... 52/101; 119/52.3; 119/57.9; 119/63
[58] Field of Search .............................. 52/101; 119/57.9, 119/63, 52.3

[56] References Cited

U.S. PATENT DOCUMENTS

| | | | |
|---|---|---|---|
| 2,891,508 | 6/1959 | Bower | 119/57.9 X |
| 4,031,856 | 6/1977 | Chester | 119/57.9 X |
| 5,355,835 | 10/1994 | Freed | 119/57.9 |
| 5,720,238 | 2/1998 | Drakos | 119/57.9 |

*Primary Examiner*—Christopher Kent

[57] ABSTRACT

A squirrel-proof post is composed of a post, supporting a bird feeder or bird house, an annular sleeve, a set of springs, and a means of securing the springs to both the platform supporting the bird feeder or house and to the sleeve. The set of springs will be naturally somewhat elongated due to the weight of the sleeve. When the squirrel climbs up the post and onto the sleeve or else jumps from the ground onto the sleeve, the additional weight will cause the sleeve to begin to slide down the post at a rate approximating free fall. This sudden and rapid acceleration induces the squirrel to immediately jump off the sleeve, returning to the ground unharmed. The reduction in weight acting in opposition to the restoring force of the springs will rapidly result in the return of the sleeve toward its equilibrium position. The rapid rate of return will prohibit other, lighter squirrels from either jumping on the sleeve and being boosted toward the bird feeder or house or from jumping to a position on the pole above the sleeve, thus circumventing its intended deterrence. The oscillatory motion of the sleeve, induced by the squirrel's jumping on and off the sleeve, can persist for several tens of seconds, during which the squirrel(s) will not be inclined to repeat the attempt. Eventually, the squirrel will become discouraged and leave the area. In this fashion the apparatus prevents the squirrel from gaining access to the bird platform.

6 Claims, 4 Drawing Sheets

SQUIRREL-PROOF POST

BACKGROUND OF THE INVENTION

Bird feeders are prone to being accessed by a variety of animals other than the intended fowl. Foremost among the invaders is the squirrel. Despite many attempts to devise a bird feeder, either post-mounted or of the hanging type, that is resistant to being looted by the squirrel, no consistently-effective product exists. The past attempts have included weight-activated electric shock deterrent feeders, weight-activated barrier systems, as well as even greased-pole mounted feeders. Although they may prevent access by the squirrel to the bird feed initially, the squirrel has always been able to circumvent all barriers placed in its path, in time.

Although some of the failures are related to the mechanics of the design (e.g., electric system breakdown, corrosion of movable joints/components, etc.), other failures are due to the intelligence of the squirrel and the fact that squirrels may often "invade" the feeder in groups.

SUMMARY OF THE INVENTION

In accordance with the present invention, a sleeve, of sufficient length to carry the whole length of the squirrel's body and of sufficient diameter in order to slide up and down over the immobile post which supports the bird feeder itself without significant friction, is placed about the post. A set of springs is used to support the sleeve. The springs are securely attached to the top end of the feeder post. When a squirrel climbs the post and reaches the position of the sleeve or jumps onto the sleeve, the sleeve will begin to rapidly accelerate toward the ground. As the squirrel is keenly sensitive to acceleration, the squirrel will quickly jump off the sleeve. The reduction in weight supported by the springs will result in the rapid acceleration of the sleeve toward its equilibrium position. The sleeve will continue to oscillate about its equilibrium position until frictional forces have dissipated the stored gravitational energy. This oscillation will dissuade the squirrel(s) from a renewed attempt to gain access to the bird feeder. The rapid acceleration of the sleeve toward its equilibrium position that ensues immediately after the squirrel leaves contact with the sleeve also inhibits other squirrels from gaining access to the sleeve, possibly aiding their attempts to circumvent the deterrence system. After several attempts, the squirrel(s) will become discouraged and will leave, unfed and unharmed.

The key to the success of the invention lies in the near-free-fall rate of acceleration experienced by the squirrel upon accessing the sleeve as well as the rapid rate at which the sleeve begins to return toward its initial position after the squirrel jumps from the sleeve. Prior art, such as U.S. Pat. No. 4,031,856 provides for a mechanism which induces a sense of insecure footing when accessed by the squirrel. However, as will be seen, either the rate of downward acceleration will be significantly less than the rate of free fall or the rate at which the mechanism resets itself will be slow and non-threatening enough that squirels can circumvent the mechanism.

Other objects, features and advantages of the invention will appear from the disclosure hereof.

DESCRIPTION OF THE PREFERRED EMBODIMENT

Figure 1:
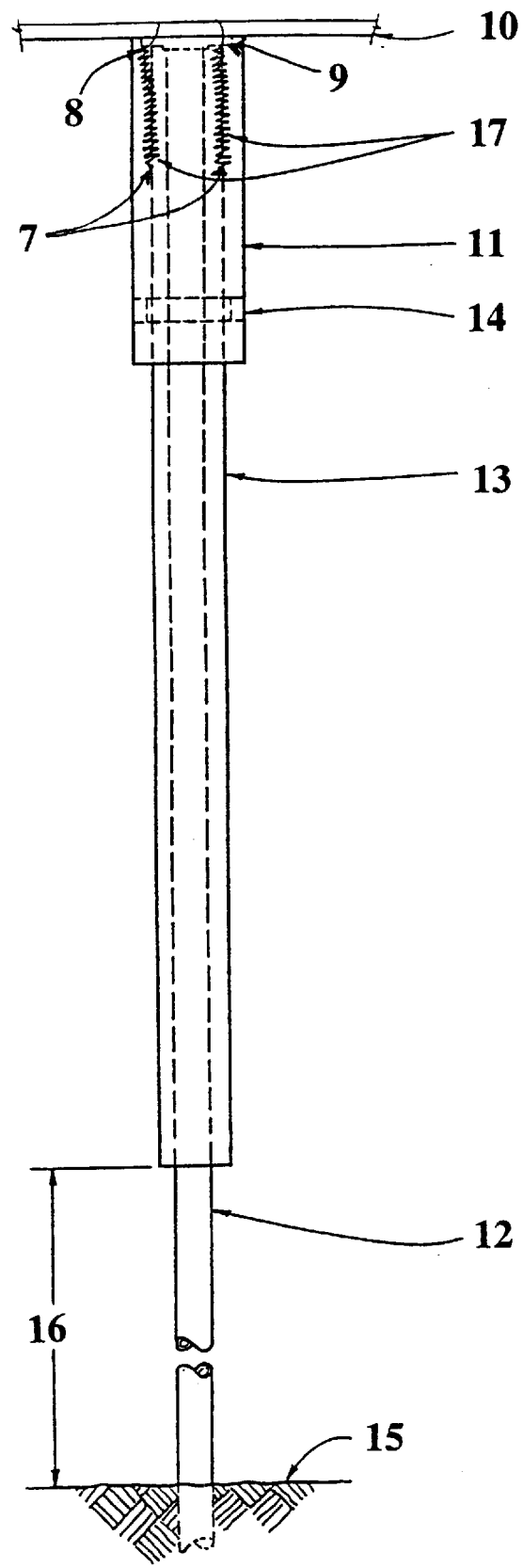
FIG. 1 is a side elevation illustrating a squirrel-proof post, consisting of one sleeve and one set of dual springs.

Although the disclosure hereof is detailed and specific in order to enable those skilled in the art to practice the invention, the physical embodiments herein disclosed are simply meant to exemplify the invention, which may also be embodied in other specific structures. The scope of the invention is defined in the claims appended hereto.

The device of the present invention is useful for protecting any elevated bird-oriented platform, such as a bird feeder or bird house.

The post 12 is desirably fabricated out of a metal pipe or tube and has a hollow interior. It is usually supported in an upright position by insertion into a pilot hole located in the ground 15, but it may be alternatively supported by means of its insertion into a heavy base which sits on top of the ground. Such a base should be of sufficient size and weight so that the total structure (base, post, and feeder or house) has a moment of inertia sufficient to stabilize the total structure against tipping over. The bird platform 10 at the top of the post and which is exemplified herein as a bird feeder.

In accordance with the present invention, the platform 10 is attached to the supporting post 12 by use of an attachment platform 9. The set of dual springs 17 are attached to the platform 9. This attachment may be accomplished, for example, by the use of two bolts. A protective hood 11 is mounted onto the platform 9. Here, too, this attachment may be accomplished by the use of two or more bolts. The hood 11 is used to protect the springs 17 and all attachments from the elements, without which rapid corrosion of same may occur. Furthermore, hood 11 serves to preserve the appearance of the overall unit. It may be composed of any durable substance, for example, 26 ga., seamless aluminum. Furthermore, it may be painted in order to improve the appearance of the invention.

The opposing ends of the spring set 17 are attached by the fittings 7 in any reliable and convenient fashion to the sleeve 13. The diameter of sleeve 13 is chosen to be smaller than that of the hood 11 and greater than that of the support post 12. The length of the sleeve 13 is chosen in order that the distance 16 is great enough that, when the squirrel accesses the sleeve, the weight of the squirrel is insufficient to induce the sleeve to travel all the way to the ground 15. If this distance is improperly chosen to be too small, the squirrel may be injured when the sleeve comes into contact with the ground or other squirrels may take advantage of the fact that the sleeve 13 is atop the ground 15 and stationary in order to jump onto the sleeve and begin to climb it. Any squirrel accessing the sleeve 13 while it was in contact with the ground 15 may find little difficulty climbing the sleeve 13 and, ultimately, reaching the platform 10. On the other hand, the length of the sleeve 13 should be great enough that the squirrel could not simply climb the post 12 to a point just beneath the sleeve 13 and then either jump from this position onto the hood 11 or else merely reach across the sleeve 13 to grasp a foothold on the hood 11 without having to support a significant percentage of its weight with the sleeve 13. To this end, the sleeve 13 should be several feet in length, at minimum.

The sleeve 13 is chosen to be composed of a lightweight durable, weather-resistant material, for example, 26 ga., seamless aluminum. Furthermore, it may be painted in order to improve the appearance of the invention. The bushing 14 is supplied in order to insure that during repeated attempts by a squirrel, or groups thereof, the motion of the sleeve 13 within the hood 11 does not cause undue twisting of the springs 17 or result in the dislodging of any component from its intended attachment(s). If the size of the bushing 14 is judiciously chosen, in addition to the functions listed above, the bushing 14 can function to produce a chime-like sound when the squirrel attempts to access the feeder, farther inducing unease in the squirrel.

The springs 17 are chosen in order that their stiffness is neither too great, making the acceleration experienced by the squirrel smaller and less frightening than it could be, nor too small, resulting in greater elongations during the squirrels' attempts and therefore possibly to fatigue failure of one or both of the springs 17.

In use, a squirrel will either climb the post 12 or jump directly onto the sleeve 13 in attempt to reach the feeder platform 10, enabling it to steal the food from the feeder. In either case, when the squirrel reaches the sleeve 13 and begins to apply a force upon it, the springs 17 will react by beginning to elongate. This reaction will occur within milliseconds, giving the squirrel very little time to react in any fashion except to jump to the ground. The squirrel having returned to the ground, the sleeve 13 will rapidly return toward its equilibrium position. It will continue to oscillate about its equilibrium position, occasionally chiming when it comes into contact with the bushing 14, until friction and other non-conservative forces dampen its motion completely. During this period, the squirrel will not be inclined to re-attempt access.

Figure 3:
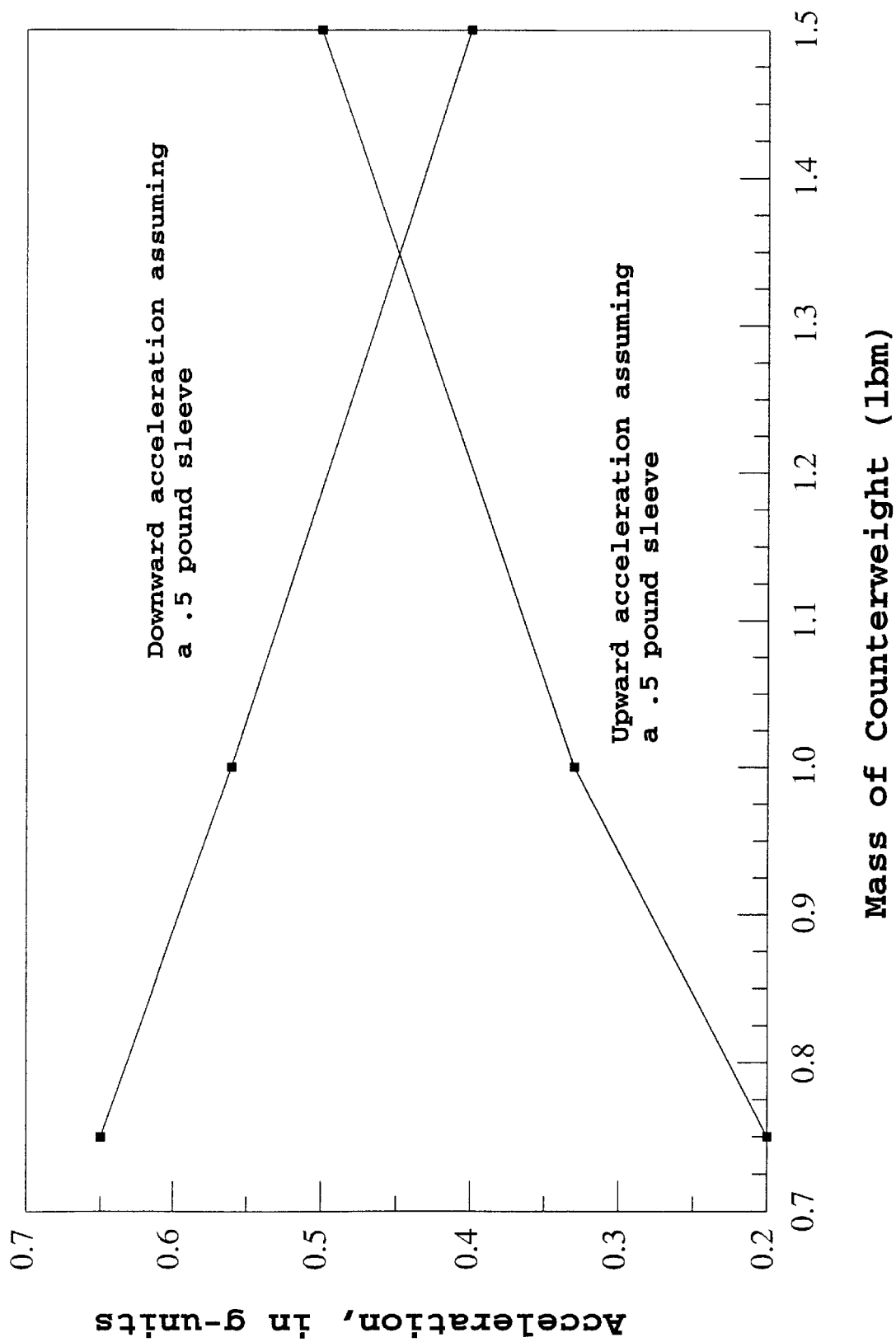
FIG. 3 is a graph indicating both the downward acceleration (vs. the weight of the counter-weight) of a squirrel grasping a sleeve which is affixed in a manner taught by Chester (U.S. Pat. No. 4,031,856) and the upward (i.e., "resetting motion") acceleration of the sleeve after the squirrel releases the sleeve.

When the laws of physics are applied, it is readily seen that the types of motion found when the squirrel jumps onto and off the sleeve in the present invention differ substantially from the types of motion found in the case of U.S. Pat. No. 4,031,856. FIG. 3 is a plot of the motions seen when the squirrel jumps onto and off from the sleeve which is biased to the top of a post by means of a pulley and counter-weight system. Assuming a half-pound sleeve, a one pound squirrel, and a frictionless pulley whose moment of inertia is negligible, the accelerations, both downward with the squirrel on-board and upward after the squirrel has jumped from the sleeve, depend upon the mass of the counter-weight used to bias the sleeve toward the top of the post as the mass of the counter-weight increases, it can be seen from the figure that the downward acceleration decreases while the rate at which the sleeve accelerates back to the top of the post increases.

The significant of these predictions is this: a squirrel is sensitive to acceleration; the greater the acceleration, the greater the impact upon the squirrel's senses. Thus, it would seem that it is most advantageous to maximize this acceleration, thereby producing the greatest unease in the squirrel and the greatest inhibition to continue to climb the sleeve or to retry the access the feeder. The maximum downward acceleration is achieved with no counterweight. That acceleration's value is 1 g. Unfortunately, if the counterweight is missing or has minimal mass, the return acceleration is at a minimum; the sleeve will take a relatively long time to return to its position at the top of the post. During this time, the squirrel, or other squirrels, can jump to a position above the sleeve and climb the post relatively unimpeded until the feeder platform is accessed. Increasing the mass of the counterweight decreases the time it will take the sleeve to return to the top of the post, but will also decrease the downward acceleration, making the whole "ride" seem much less frightening for the squirrel.

Figure 4:
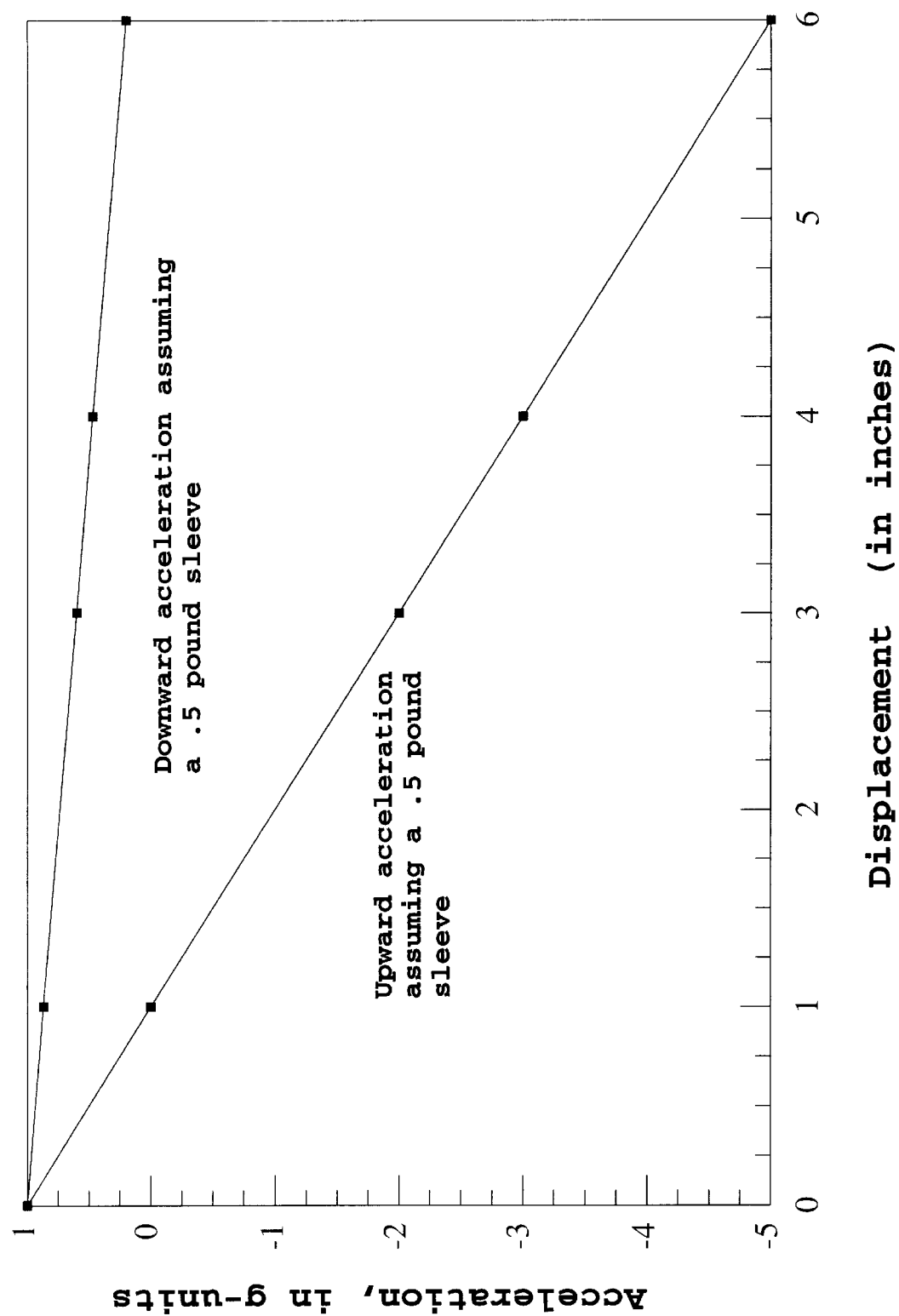
FIG. 4 is a graph indicating both the downward acceleration (vs. the distance fallen) of a squirrel grasping a sleeve which is affixed in the manner taught herein and the upward (i.e., "resetting motion") acceleration of the sleeve after the squirrel releases the sleeve, having fallen some distance while grasping it.

In comparison, FIG. 4 is a plot of the motions seen when a squirrel jumps onto and off from the sleeve 13 of the present invention. The calculations which were made in order to form the plots shown on FIG. 4 were based upon an assumed sleeve weight of 0.5 pounds, an assumed squirrel weight of 3 pounds, and an assumed spring constant of 3 pounds per foot. Dual springs were assumed. Immediately after accessing the sleeve, the squirrel will experience a downward acceleration equal to 1 g. This is the same acceleration as that experienced during free fall. Within a few tenths of a second, the squirrel, taken aback by the lack of firm footing, will return to the ground. During this time, the sleeve will have traveled downward perhaps 2–4 inches, at most. FIG. 4 predicts that after the squirrel jumps from the sleeve, the return acceleration will be in the 2–3 g range, sufficiently fast to frighten any nearby squirrels from hopping aboard the sleeve.

Figure 2:
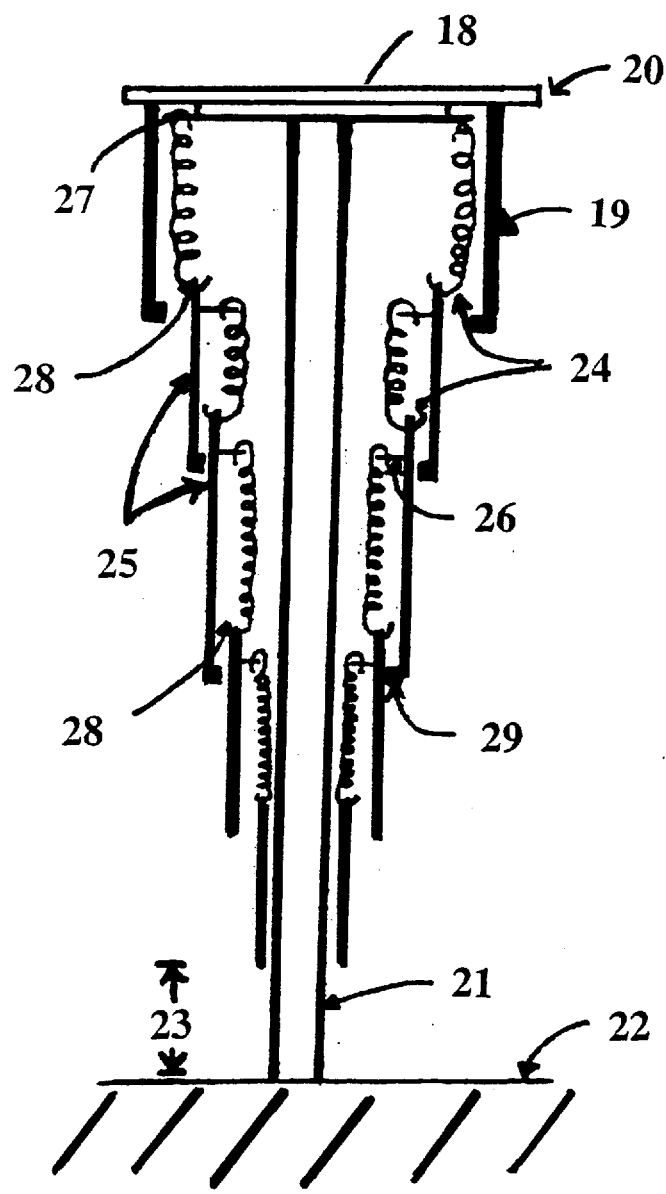
FIG. 2 is a side (cut-away) elevation illustrating another, but related, type of squirrel-proof post, consisting of four telescoping sleeves and four sets of dual springs.

In a related embodiment, a series of sleeves and sets of attaching springs is utilized to deter squirrels from accessing the feeder platform. Referring to FIG. 2, the feeder platform 20 is mated to the base attachment 18, which in turn is attached to the support post 21, which can be secured into the ground 22. The hood 19 is affixed to the feeder platform 20. The fittings 27 are used to attach one end of the primary set of springs 24 to the base attachment 18. To the other end of the springs 24, the first sleeve 25 is attached via the fitting 28. As before, the hood 19 is equipped with a bushing such as 29. (All sleeves 25 but the last are also fitted with bushings 29.) As before these bushings 29 will allow for some of the mechanical energy released after the squirrel jumps from one of the sleeves to be converted into sound, increasing the frightening effect. The bushings 29 also prevent excessive twisting of the springs 24 and lessen the chance that they may become unattached from their fittings 27 or 28. The next set of springs 24 is attached to the next sleeve 25 via a fitting 26 situated on the inside of the sleeve above and a fitting 28 on the top of the sleeve below. The diameter of the sleeves telescopes downward. In this fashion, several sets of sleeves may be secured to one another, with one set affixed to the base attachment. As before, the choice of the distance 23 is made in order to prevent injury to the squirrel.

In use, the second embodiment functions much as the preferred embodiment except that the oscillatory modes of the sleeves, after the squirrel jumps from whatever sleeve it may have accessed, are significantly different and make the deterrent effect produced by the oscillation greater. Additionally, by judicious choice of the diameters of the sleeves, the substance of their composition, and the substance of composition of the bushings, a "wind chime" effect can be obtained when a squirrel or squirrels attempt to access the feeder post. This effect will be frightening to the squirrel, but can be entertaining for a human observer. As before, the various sleeves may be painted in a fashion to enhance the appearance of the overall feeder post.

What is claimed is:

1. A squirrel-proof post comprising a post adapted to support a bird feeder platform at a top of the post; a means of securing a bottom of the post in a stable fashion, with one end of a spring attached near the top of the post and another end of the spring, attached to a sleeve, said spring and sleeve supplying a means of inducing a feeling of free fall in any squirrel attempting to access the feeder platform from below with said sleeve sliding freely over a outside of the post.

2. The invention of claim 1 in which a fixed hood is provided in order to protect the spring and all attachment points from the elements as well as to protect a squirrel from becoming entangled in the spring.

3. The invention of claim 2 in which a means of producing a sudden sound is provided and which said means of producing a sudden sound, is activated by a squirrel's attempt to access the feeder platform.

4. squirrel-proof post comprising a post adapted to support a bird feeder platform at a top of the post; a means of securing a bottom of the post in a stable fashion, with ends of at least two springs attached, near the top of the post and attached to a sleeve other ends of said at least two springs; said springs and sleeve supplying a means of inducing a feeling of free fall in any squirrel attempting to access the feeder platform from below with said sleeve sliding freely over an outside of the post.

5. The invention of claim 4 in which a fixed hood is provided in order to protect the springs and all attachment points from the elements as well as to protect a squirrel from becoming entangled in the springs.

6. The invention of claim 5 in which a means of producing a sudden sound is provided and which said means of producing sudden sound is activated by a squirrel's attempt to access the feeder platform.

\* \* \* \* \*